United States Patent Office 2,957,831
Patented Oct. 25, 1960

2,957,831

PREPARATION OF POLYURETHANE RESIN FOAMS USING MIXTURES OF TERTIARY AMINES AND ACID ANHYDRIDES AS CATALYSTS

Earl E. Parker, Allison Park, Pa., assignor to Pittsburgh Plate Glass Company, a corporation of Pennsylvania No Drawing. Filed Oct. 3, 1955, Ser. No. 538,275

4 Claims. (Cl. 260—2.5)

This invention relates to the curing of resinifiable materials and it has particular relation to the curing of foamable mixtures of (A) alkyd resins containing available hydroxyls and (B) diisocyanates.

Heretofore it has been noted that alkyd resins and notably those comprising polester chains of non-ethylenic dibasic acids and polyhydric alcohols containing hydroxyls at appropriate points in the polyester chain can be reacted with a diisocyanate to effect cross-linking between contiguous polyester molecules at points of hydroxylation. The polyester is thus transformed into a thermoset, urethane resin. If the reaction is conducted in the presence of water (either free or latent, as for instance in a hydrated salt) a part of the diisocyanate will also react to liberate gas (carbon dioxide) which under appropriate conditions, converts the mixture to a foam that ultimately sets to a solid state. The basic chemistry involved in these reactions is discussed to some extent in an article by Bayer et al. in "Rubber Chemistry and Technology," volume 23, pages 812–835, and again in an article by A. C. Stevenson, Rubber Age, volume 77, No. 1, pages 63 to 68, and still again in an article in Fortune, March 1955, pages 110–113 and pages 166 and 169.

The foregoing reactions are usually conducted in the presence of a catalyst, of which, tertiary amines such as N-methyl morpholine, are outstanding examples. The foregoing reaction between the polyester and the diisocyanate, in the presence of such catalyst, however, is initiated very quickly and proceeds with such dispatch that considerable difficulty has been experienced in attaining complete mixture of the several components before the reaction has proceeded so far as to preclude proper mixing.

This invention is based upon the discovery that the foregoing difficulties can be overcome by adding to the reaction mixture of polyester and diisocyanate a material resulting from mixing an anhydride of a carboxylic acid and a tertiary amine. By use of such materials, the initiation of the reaction is sufficiently delayed to permit complete mixing of the several reaction components before substantial gelation can occur. When the thoroughly mixed components react in accordance with the provisions of the present invention, the resultant foams are of exceptionally fine and uniform cell structure.

The material from mixing acetic anhydride and N-methyl morpholine constitutes one of the most satisfactory of the catalytic materials. Related materials which are also useful as delayed action catalysts may be prepared from N-methyl morpholine and anhydrides of acids such as succinic acid and maleic acid, propionic acid, diglycolic acid, phthalic acid, and others. N-methyl morpholine may be replaced in the materials by other N-alkyl morpholines, such as N-ethyl morpholine or N-lauryl morpholine. The N-alkyl morpholines may also be replaced by other tertiary amines, such as trimethyl amine or triethyl amine, and other amines.

Polyesters which in mixture with a diisocyanate are especially useful with the catalysts herein disclosed, are of relatively low acid number; not above 50 or 60 and preferably below 12. They may be down to 1, or as much below as is attainable. A good range of acid value is between about 1 and 5. The polyesters of higher acid number are inherently reactive with diisocyanates and hence, there is less point in adding a catalyst to them. The polyesters in which the catalyst materials contemplated by this invention are especially useful, have a hydroxyl to carboxyl ratio of at least 5 to 1 and they may go up to 600 or 700 to 1, or even above.

The hydroxyl value preferably is in a range of about 15 to 500 or 600. If the polyesters are to be used in the preparation of flexible foams, the hydroxyl value may be in the lower portions of the range, e.g., about 15 to 160. In the preparation of rigid foams, it is preferable that the hydroxyl value be in the higher portions of the range, e.g., from about 200 to 500 or 600. The products from polyesters in the intermediate range may be of intermediate flexibility.

The polyesters should be at least viscously liquid or they should be susceptible of being rendered liquid by application of heat. Such polyesters may be prepared by condensation of a dicarboxylic acid and a polyhydric alcohol, such as one of the glycols or preferably a mixture of a glycol and an alcohol containing 3 or more hydroxyls, such as glycerol, pentaerythritol or the like.

Appropriate acids for use in the preparation of the polyesters comprise those containing aliphatic chains interconnecting the carboxyls, being represented by succinic acid, adipic acid, sebacic acid, azelaic acid, and others containing up to about 10 carbon atoms. Aryl dicarboxylic acids, such as phthalic acid, terephthalic acid, or isophthalic acid, or their homologues and chloro derivatives, where substitution, if any, involves one or more of the positions in the ring, are also included. Blends of two or more acids in equal molar proportions or in other ratios are also included within the scope of the invention. It is to be recognized that the term dicarboxylic acid also includes the anhydrides of the acids since the anhydrides form the same esters as the free acids and in many instances it is preferable to work with the anhydride rather than the acid.

At least a portion of the saturated acids in the polyesters may be replaced by acids containing alpha ethylenic unsaturation. These are represented by maleic acid and itaconic acid. Preferably, these acids are reacted with dihydric alcohols of fairly long chain length and being represented by triethylene glycol or tetraethylene glycol.

Usually the polyesters will include as the polyhydric alcohol a substantial amount of a dihydric alcohol such as ethylene glycol, propylene glycol, diethylene glycol, dipropylene glycol, trimethylene glycol, butane diol-1,3, and in some instances polyethylene glycol such as is sold on the market under the familiar trade name of Carbowax. Likewise, polyethers containing hydroxyl groups and being represented by the polyether of butane diol-1,4 may be employed. Blends of two or more of the dihydric alcohols are included within the purview of this invention. Polyhydric alcohols include, glycerol, hexanetriol, pentaerythritol, trimethylol ethane, trimethylol propane, mannitol, and others. In flexible foams, these usually are employed in lesser amount than the dihydric alcohol and are designed to provide free hydroxyls especially at intervals along the polyester chain. In rigid foams, much higher ratios of polyhydric alcohol may be employed. Indeed the alcohol component may be exclusively polyhydric. Usually the polyhydric alcohol and dihydric alcohol are employed in a substantial excess, e.g. 5 to 200 percent excess over the total of the carboxyls available in the reaction mixture from which the polyester is derived.

The reaction of esterification between the polyhydric alcohol and the dibasic acid components of the mixture is conducted in accordance with the conventional procedures by heating a mixture, often in the presence of a diluent such as xylol at reflux conditions, to evolve and remove water. The reaction is continued until desired viscosity and acid number are attained. Since the preparation of such polyesters is a well recognized art, elaboration upon the mode of conducting the esterification reaction is not deemed to be necessary.

Diisocyanates which may be interacted with polyesters, such as those above referred to, include chlorophenyl 2,4 - diisocyanate, p-phenylene diisocyanate, tolylene diisocyanate (mixed isomers), diphenyl methane 4,4' diisocyanate, hexamethylene diisocyanate, and others. The tolylene diisocyanate mixed isomers, such as those sold as Mondure TD or Hylene TM, because of general availability and satisfactory operation in the process, are presently preferred, though, of course, as commercial conditions change, this preference is also subject to change.

Where foamed resins are to be prepared by the interaction of a polyester and a diisocyanate, water in latent form, as for instance in a hydrated salt, ordinarily should be included in the reaction mixture. Any of the hydrated salts which liberate water at temperatures within a reasonable range may be employed. Appropriate salts comprise the heptahydrate of magnesium sulfate, or the trihydrate of sodium acetate, or Glauber's salt, or the heptahydrate of sodium sulfate. It is to be understood that the water reacts with the diisocyanate more or less competitively with respect to the cross-linking reaction as a result, carbon dioxide is liberated. It is to be understood that carboxyl groups in the polyester also react with diisocyanates under appropriate conditions to liberate carbon dioxide though in the present instance, this latter reaction appears to be of minor importance inasmuch as the available carboxyl content of the polyester is relatively low.

In order to provide foamed polyester-diisocyanate derivatives, it is usually preferable to incorporate with the mixture of the polyester and the diisocyanate an emulsifying agent which has a capacity of promoting emulsification or distribution of the diisocyanate and polyester as well as the other ingredients of the mixture. It would appear that the emulsifying agent also acts like soap in water in forming cells or bubbles in the liquid mixture. Therefore, it facilitates formation of bubbles, maintains them until the resin has set to sufficient degree to retain them without assistance and perhaps assists in attainment of uniformity of structure. As the reaction proceeds and the cross-linking between the diisocyanate and the polyester molecules competing with the decomposition to form gases, attains a sufficiently advanced stage, the resinifiable components thicken to a degree inherently to retain the gases. Ultimately, the resinifiable components attain a solid, thermoset state providing a permanent foam comprising a polyurethane resin which may be relatively rigid or flexible dependent upon the composition of the polyester.

Emulsifying agents which may be incorporated with the polyester-diisocyanate mixtures of the present invention comprise the well recognized anionic, cationic, or non-ionic wetting agents and detergents which are familiar to the art. A well recognized and familiar example of one such material sold commercially under the trade name of Emcol H-77 (sold by the Emulsol Corporation and which is an ionic emulsifier which is a blend of polyalcohol, carboxylic acid esters and sulfonated oils) is particularly effective in the process. Other emulsifying agents comprise Emulphor ELA which is a condensation product of ethylene oxide and fatty acids free of soap. Still another emulsifying agent is sold commercially as Tween-40, which is polyoxyethylene sorbitan monopalmitate, Tween-60 which is polyoxyethylene sorbitan monostearate should also be included in this group. It is to be understood that any other emulsifying agent conventionally employed in forming foams in systems comprising polyesters and diisocyanates may be employed with the catalysts herein disclosed.

A generalized formulation of a composition suitable for forming foam resins in accordance with the provisions of the present invention is:

| | Parts by weight |
|---|---|
| Polyester | 100 |
| Emulsifier | 0.1-10 |
| Hydrated salt having a water equivalency of | 0.1-5 |
| Delayed action catalyst | 0.2-5.0 |
| Diisocyanate | 20-100 |

The delayed action catalyst is added to the mixture of the other ingredients. The polyester in the above formulation preferably is of an acid number of about 1 to 60, e.g., 1-15, and a hydroxyl number of about 20 to 500 or 600.

It is to be recognized that the reaction herein disclosed will proceed at normal room temperature, but the reaction is exothermic in nature. It can, if desired, be promoted by the application of mild heat. It is often desirable, for example, to heat the foamable mixture in order to effect completion of the cross-linking action, to a temperature of about 100° C. to 200° C. for about a period of about 10 minutes to 2 hours. A good temperature range for the final reaction is 104° C. to 150° C. for about 30 minutes.

It is to be recognized that where the foregoing mixture is made up in accordance with this invention, with a delayed action catalyst, such as is obtained by mixing N-methyl morpholine and acetic anhydride, that the liquid mixture can be thoroughly agitated in order to obtain uniform distribution of all components of the mixture without any undue tendency for the mixture to gel prematurely. The mixture can be poured out in molds or in other desired manner while still completely ungelled. However, ultimately, either as a result of exothermic rise or by reason of the application of external heat to the mixture, the catalyst becomes completely effective, thus effectively catalyzing the reaction to produce a foam of fine minute cells of relatively high volume. The polyester-diisocyanate interpolymer is mechanically strong and chemically resistant.

The preparation of a polyester suitable for use in the practice of the invention is illustrated by the following examples:

*Example A*

This alkyd resin was prepared from a mixture comprising:

| | | |
|---|---|---|
| Adipic acid | moles | 16 |
| Diethylene glycol | do | 18 |
| Glycerin | do | 1 |
| Catalyst of esterification (toluene sulfonic acid)[1] | | 0.1 |

[1] Percent based upon the mixture.

This mixture was reacted in accordance with conventional procedures to form a liquid resin having a hydroxyl value in a range of 60 to 80 and an acid number of 2 or less. The polyester is liquid in form. This polyester is of rather low hydroxyl value and often employed in forming more flexible foams.

Types of resins well adapted for the preparation of more rigid foams are such as the following:

Example B

The resinifiable mixture comprised:

| | Moles |
|---|---|
| Phthalic anhydride | 2 |
| Adipic acid | 10 |
| Trimethylol propane | 20 |

The mixture preferably is cooked to an acid value of about 1 and a hydroxyl value of about 450. The resin is liquid and the high hydroxyl value renders it especially useful in forming rigid foams.

Example C

The resinifiable mixture comprised:

| | Moles |
|---|---|
| Phthalic anhydride | 1 |
| Adipic acid | 5 |
| Glycerol | 8 |

The mixture preferably is cooked to an acid number of about 10. The polyester is of high hydroxyl value and is a liquid product well adapted for mixing with diisocyanates, emulsifying agents and delayed action catalysts as herein disclosed. The resin foams may be of the rigid type.

Example D

A polyester was prepared comprising:

| | Moles |
|---|---|
| Glycerol | 7.6 |
| Adipic acid | 5.0 |
| Phthalic anhydride | 1.0 |

The mixture was cooked to an acid value of 42–46, a hydroxyl number of 400 to 500 and a viscosity of 45,000 to 70,000 cps. It could be mixed with diisocyanates such as a mixture of tolylene diisocyanates, emulsifying agent, hydrated salt such as the decahydrate or heptahydrate of sodium sulfate and a delayed action catalyst as herein disclosed, and foamed.

Example E

A further liquid polyester comprising a fatty acid was prepared. The polyester contained:

| | Moles |
|---|---|
| Adipic acid | 4 |
| Phthalic anhydride | 1 |
| Oleic acid | 2 |
| Glycerol | 8 |

Foamable mixtures of the polyester may contain delayed action catalysts as herein disclosed.

Example F

In this example, the polyhydric alcohol component comprised a mixture of diethylene glycol and pentaerythritol. The proportions of the components of the polyester were as follows:

| | Moles |
|---|---|
| Adipic acid | 5 |
| Phthalic anhydride | 1 |
| Diethylene glycol | 4 |
| Pentaerythritol | 3.6 |

The mixture when cooked, forms a polyester suitable for use in the several foamable compositions hereinafter described. Diisocyanates, such as tolylene diisocyanate mixed isomers can be mixed with the foregoing polyesters, a source of latent water such as sodium acetate trihydrate, hydrated magnesium sulfate, hydrated sodium sulfate (such as the decahydrate or heptahydrate) or other salt which is of reasonably neutral value, an emulsifier, and a delayed action catalyst obtained by mixing acetic anhydride and N-methyl morpholine and can be reacted to form foams as herein disclosed. The resultant mixtures can be agitated in order to attain thorough distribution without setting up prematurely. The foams formed can be cured in the manner previously described to provide a structure of fine and uniform cells. The structures are rigid or flexible in accordance with the polyester used and other factors well understood in the art and are adapted for many uses characterizing such structures, such as in mattresses, cushions, insulation and many other applications.

It is to be understood that the principles of the present invention may also be employed in forming rigid foams such as are often used in thermal insulation, as fillings for hollow metal airplane propellers and for various other purposes.

Some specific examples illustrating the use of delayed action catalysts in preparing foams are as follows:

Example I

In this example, a polyester of adipic acid and a mixture of diethylene glycol and gylcerine of substantially the constituency obtained in Example A was employed as the ester component. The polyester, hydration paste, emulsifying agent and catalyst were first mixed and subsequently the diisocyanate was added to the mixture. This procedure is usually followed in the preparation of the other foamable mixtures herein disclosed. However, it is also permissible to mix all components concurrently.

| | Grams |
|---|---|
| Polyester | 76 |
| Hydration paste | 30 |
| N-methyl morpholine and acetic anhydride | 5 |
| Wetting agent (Emcol H-77) | 2 |
| Tolylene diisocyanate (mixed isomers added last) | 25 |

In the above mixture, the hydration paste comprised sodium acetate trihydrate as a 20 percent mixture in polyester also of the composition outlined in Example A. The foregoing foamable mixture was thoroughly stirred. The mixture foamed within about 3.2 minutes; but was allowed to stand for 1 hour, after which, it was heated to 220° F. for an additional hour. The mixture foamed well and provided a flexible structure of fine grain. The foam is susceptible of various uses such as heat insulation and for many other purposes. The mixture could also be applied by spraying or spreading by techniques familiar in the art. Subsequently, it is cured to form the desired foam resin.

Example II

This example is similar to Example I, except that the catalyst (the N-methyl morpholine-acetic acid anhydride composition) of the former example was replaced by 5 grams of the material from mixing maleic anhydride and triethyl amine. The foam time was 6.6 minutes. The density was 5.52 lbs./ft.$^3$. The product was very satisfactory in texture and was useful for purposes such as cushioning, thermal insulation or as insulation against the transmission of vibration or sound in walls and other structures.

Example III

The hydrating paste mixture of this example comprised a 20 percent mixture of magnesium sulfate heptahydrate in the polyester of Example A. The foamable mixture comprised:

| | Grams |
|---|---|
| Polyester | 60 |
| Hydrating paste | 50 |
| Tetrahydrophthalic anhydride and N-methyl morpholine | 5 |
| Emcol H-77 | 2 |
| Tolylene diisocyanate mixed isomers | 25 |

The mixture was well agitated. It foamed in 3 minutes, but was allowed to stand for an hour and was then cured for 1 hour at 220° F. to provide a fine grained foam structure.

Example IV

In this example, the hydrating paste comprised a 20 percent solution of magnesium sulfate heptahydrate. The emulsifying agent was Arquad 2–C which is itself a quaternary ammonium compound which is the chloride salt of a quaternary containing two methyl groups and two long chain groups containing 16 to 18 carbon atoms. The catalyst was obtained by mixing maleic anhydride and N-methyl morpholine. The foamable composition comprised:

| | Grams |
|---|---|
| Magnesium sulfate heptahydrate paste | 50 |
| Polyester (as in Example A) | 40 |
| Catalyst as a paste of 20 percent concentration in the polyester of Example I | 25 |
| Arquad 2–C | 1 |
| Tolylene diisocyanate mixed isomers | 25 |

The mixture was well agitated, allowed to stand and foam at room temperature and was then cured for 1 hour at 220° F. The foam time of the mixture was 135 seconds; the density was 6.17 pounds per cubic foot.

Example V

A mixture was prepared comprising:

| | Grams |
|---|---|
| Polyester as per Example A | 88.8 |
| Sodium acetate trihydrate | 17.2 |
| Tween–40 | 2.0 |
| Tolylene diisocyanate mixed isomers | 25.0 |
| Catalyst [1] | 1.2 |

[1] Catalyst is obtained by mixing N-methyl morpholine and succinic anhydride.

The above ingredients were well mixed, and cured at 220° F. for ½ hour, to provide a polyester foam.

Most of the foregoing resins are relatively flexible in character. More rigid types may be prepared in similar manner. Preferably the polyesters employed in preparing rigid foams are of higher hydroxyl value. Rigidity may also be increased by increasing the diisocyanate content. The following examples illustrate the preparation of relatively rigid foams:

Example VI

In this example, a rigid foam resin was prepared. The foamable composition was as follows:

| | Parts by weight |
|---|---|
| Polyester (as per Example B) | 100 |
| Glauber's salt | 3.57 |
| Emulsifier (Tween-40) | 2 |
| Tolylene diisocyanate (Desmodur T) | 70 |
| Catalyst (obtained by mixing acetic anhydride and N-methyl morpholine) | 1 |

The Glauber's salt is employed as a 35 percent paste in the polyester component.

A generalization of this formula would be as follows:

| | |
|---|---|
| Polyester | 100 |
| Emulsifier | 0.2 to 6 |
| Catalyst | 0.2 to 5 |
| Glauber's salts (decahydrate) | 0.4 to 7.5 |
| Diisocyanates | 59 to 100 |

Glauber's salt in the foregoing formulation may be replaced by an amount of other hydrated salt which will provide an equivalent amount of water. The salt may be, for example, a sodium sulfate of lower degree of hydration than the decahydrate.

Example VII

In this example, the polyester (B) of Example VI is replaced by a similar amount of polyester C. The techniques are in other respects the same as in Example VI. Any of the other polyesters given in Examples D, E, and F may be substituted for C in Example VII to provide useful relatively rigid foams.

The use of polyesters of polycarboxylic acids and alcohols containing a plurality of hydroxyls as the hydroxyl supplying agent for reaction with a diisocyanate has been emphasized If the materials from mixing tertiary amines and carboxylic acid anhydrides are employed as delayed action catalysts in such mixtures, very satisfactory products are obtained. However, the polyesters may often be replaced in part or in toto by other organic compounds of high molecular weight containing two or more hydroxyls per molecule. The following examples are illustrative of the use of such compounds:

Example VIII

In this example, the polyesters of the preceding examples are replaced by castor oil. The foamable mixture of the following composition is:

| | Parts by weight |
|---|---|
| Castor oil | 85 |
| Polyethylene glycol (molar weight about 200) | 15 |
| Emulsifier (Emcol H–77) | 2 |
| Water | 3–4 |
| Catalyst (obtained by mixing N-methyl morpholine and acetic anhydride) | 2 |

The foregoing mixture as an emulsion is mixed with 2.8 equivalents based upon the available hydroxyls of tolylene mixed isomers (Mondure-TD) and cured at 220° F. or thereabouts to provide a foam structure.

The examples of the invention as given are by way of illustration rather than limitation. Numerous modifications may be made therein without departure from the spirit of the invention or the scope of the appended claims.

I claim:

1. A method of preparing a foamed polyurethane resin, which comprises forming a foamable mixture by mixing 100 parts by weight of (A) a polyester which is the reaction product of a saturated dicarboxylic acid containing from 4 to 8 carbon atoms, with a polyhydric alcohol, said polyester being of an acid number of 1 to 60 and a hydroxyl number of 20 to 600; (B) an organic diisocyanate in an amount of 20 to 100 parts by weight; (C) the trihydrate of sodium acetate, said salt being present in an amount to provide 0.1 to 5 parts by weight of water; (D) 0.2 to 5 parts by weight of a delayed-action catalyst which results from mixing 1 mole of N-methyl morpholine and 1 mole of the anhydride of tetrahydrophthalic acid, and bringing the temperature of the mixture to the aforesaid range of 100° C. to 200° C. to effect foaming and curing of the same.

2. A method of forming a foamed polyurethane resin, which comprises forming a mixture of (A) 100 parts by weight of a polyester, which is of an acid value of 1 and a hydroxyl value of 20 to 600 and being the reaction product of a dicarboxylic acid and a polyhydric alcohol; (B) toluene diisocyanate in an amount of 20 to 100 parts by weight; (C) a salt which when heated to the curing temperature of the mixture, is adapted to liberate water of hydration in the mixture and being selected from the class consisting of decahydrate of sodium sulfate, the trihydrate of sodium acetate, the heptahydrate of magnesium sulfate and the heptahydrate of sodium sulfate, said salt being employed in an amount to provide 0.1 to 5 parts by weight of water; (D) 0.2 to 5 parts by weight of a delayed-action catalyst which results from the mixing of (1) 1 mole of N-alkyl morpholine, in which the alkyl group contains from 1 to 12 carbon atoms, and (2) an anhydride of a saturated carboxylic acid, said anhydride containing from 4 to 8 carbon atoms, and bringing the foamable mixture to a temperature in a range of 100° C. to 200° C. to effect foaming and curing of the same.

3. The method of claim 2, in which the anhydride is acetic anhydride and the N-alkyl morpholine is N-methyl morpholine.

4. The method of claim 2 in which the salt containing water of crystallization is sodium acetate trihydrate.

References Cited in the file of this patent

UNITED STATES PATENTS

| | | |
|---|---|---|
| 2,577,279 | Simon et al. | Dec. 4, 1951 |
| 2,634,244 | Simon et al. | Apr. 7, 1953 |
| 2,779,689 | Reis | Jan. 29, 1957 |
| 2,842,506 | Roussel | July 8, 1958 |

OTHER REFERENCES

Fieser & Fieser: "Organic Chemistry," 2nd edition; copyright 1950, page 231.

Noller: "Chemistry of Organic Compounds," copyright 1950, page 230.